(12) United States Patent
Meyer et al.

(10) Patent No.: US 11,047,702 B1
(45) Date of Patent: Jun. 29, 2021

(54) TRACKING SYSTEMS FOR ELECTRONIC DEVICES

(71) Applicant: Apple Inc., Cupertino, CA (US)

(72) Inventors: Adam S. Meyer, Cupertino, CA (US); Duncan Robert Kerr, San Francisco, CA (US); Martha Evans Hankey, San Francisco, CA (US); Peter C. Tsoi, San Jose, CA (US); John B. Morrell, Los Gatos, CA (US); James H. Foster, Oxford (GB)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 15/697,350

(22) Filed: Sep. 6, 2017

Related U.S. Application Data

(60) Provisional application No. 62/395,925, filed on Sep. 16, 2016.

(51) Int. Cl.
*G01C 21/36* (2006.01)
*G08B 21/24* (2006.01)
*H04W 4/02* (2018.01)

(52) U.S. Cl.
CPC ..... *G01C 21/3632* (2013.01); *G01C 21/3647* (2013.01); *G08B 21/24* (2013.01);
(Continued)

(58) Field of Classification Search
CPC .. G06K 9/0061; G06K 9/00671; G01C 21/00; G01C 21/206; G01C 21/3632;
(Continued)

(56) References Cited

U.S. PATENT DOCUMENTS 3,713,167 A * 1/1973 David ............... H01Q 3/24
343/797
5,202,697 A * 4/1993 Bonebright ........ H01Q 3/24
343/708
(Continued)

FOREIGN PATENT DOCUMENTS

JP 2004364229 A * 12/2004
JP 2014175858 A * 9/2014
JP 2015097081 A * 5/2015

OTHER PUBLICATIONS

Lane, Nicholas D. et al., "A Survey of Mobile Phone Sensing", IEEE Communications Magazine, Sep. 2010, pp. 140-150. (Year: 2010).*

(Continued)

*Primary Examiner* — Faris S Almatrahi
*Assistant Examiner* — David A Testardi
(74) *Attorney, Agent, or Firm* — Treyz Law Group, P.C.; Kendall W. Abbasi

(57) ABSTRACT

An electronic device may be provided with control circuitry for locating lost items. The control circuitry may determine where an item is located and may use the display or other output device to guide a user to the item. The display may display a visual guide such as an arrow, a sphere, a circle, a compass, or other visual aid that points the user in the direction of the item. The control circuitry may change the size or other characteristic of the visual aid on the display as the distance between the electronic device and the object changes. The control circuitry may change the location of the visual aid on the display as the orientation of the electronic device relative to the object changes. The display may overlay the visual aid onto live images of the user's surroundings as they are captured by a camera.

18 Claims, 10 Drawing Sheets

(52) U.S. Cl.
CPC ....... *H04W 4/02* (2013.01); *G06F 2221/2111* (2013.01); *H04M 2250/10* (2013.01)

(58) Field of Classification Search
CPC ... G01C 21/3647; G01C 15/002; G06F 3/011; H04W 4/02; H04W 4/024; H04W 4/025; H04W 4/029; H04W 4/04; H04W 4/023; G08B 21/182; G08B 21/24; G01S 13/82; G01S 13/825; H01Q 13/18; H01Q 21/08
See application file for complete search history.

(56) References Cited

U.S. PATENT DOCUMENTS

| | | | | |
|---|---|---|---|---|
| 6,377,296 | B1* | 4/2002 | Zlatsin | G06K 9/00335 348/143 |
| 7,667,590 | B1* | 2/2010 | Ryan | G08B 21/24 340/539.1 |
| 8,249,626 | B2 | 8/2012 | Huston | |
| 8,624,725 | B1* | 1/2014 | MacGregor | H04W 4/029 340/539.13 |
| 8,661,352 | B2 | 2/2014 | Gronow et al. | |
| 8,810,392 | B1* | 8/2014 | Teller | G08B 21/24 235/385 |
| 8,842,003 | B2 | 9/2014 | Huston | |
| 9,055,162 | B2 | 6/2015 | Park et al. | |
| 9,232,353 | B2 | 1/2016 | Bozarth et al. | |
| 9,330,541 | B1* | 5/2016 | Ortiz | G08B 21/24 |
| 9,600,584 | B2 | 3/2017 | Schloter | |
| 9,632,313 | B1* | 4/2017 | Madan | G06F 3/011 |
| 9,679,463 | B1* | 6/2017 | Clark | G08B 21/24 |
| 9,756,459 | B1* | 9/2017 | Walters | H04M 1/72527 |
| 2003/0034887 | A1* | 2/2003 | Crabtree | G01S 13/84 340/539.1 |
| 2004/0066293 | A1* | 4/2004 | Maloney | G01S 13/74 340/539.32 |
| 2008/0112591 | A1* | 5/2008 | Gabara | G06K 9/3241 382/103 |
| 2008/0163504 | A1* | 7/2008 | Smith | G01C 21/20 33/268 |
| 2008/0204322 | A1* | 8/2008 | Oswald | G01S 5/04 342/465 |
| 2009/0116691 | A1* | 5/2009 | Scholl | G06F 3/016 382/103 |
| 2010/0026578 | A1* | 2/2010 | Fumanz | G01S 7/06 342/419 |
| 2010/0286911 | A1* | 11/2010 | Yang | G01C 21/00 701/472 |
| 2011/0210849 | A1* | 9/2011 | Howard | H04W 4/80 340/539.32 |
| 2011/0210959 | A1* | 9/2011 | Howard | G01S 5/12 345/418 |
| 2011/0234399 | A1* | 9/2011 | Yan | H04L 43/065 340/539.32 |
| 2011/0237274 | A1* | 9/2011 | Wong | G01S 1/68 455/456.1 |
| 2011/0285506 | A1* | 11/2011 | Hillis | G08B 21/0238 340/8.1 |
| 2012/0050324 | A1* | 3/2012 | Jeong | H04N 1/21 345/633 |
| 2013/0012237 | A1* | 1/2013 | Hamynen | G06F 16/9537 455/456.3 |
| 2013/0050499 | A1* | 2/2013 | Siklossy | H04W 4/21 348/169 |
| 2013/0120145 | A1* | 5/2013 | Lim | G08B 13/1427 340/572.1 |
| 2013/0229535 | A1* | 9/2013 | Nakamura | H04N 5/23293 348/207.1 |
| 2013/0253824 | A1* | 9/2013 | Yang | G01C 21/20 701/522 |
| 2014/0044305 | A1* | 2/2014 | Scavezze | G08B 21/24 382/103 |
| 2014/0058886 | A1* | 2/2014 | Gopalakrishnan | G06Q 30/02 705/26.8 |
| 2014/0104453 | A1* | 4/2014 | Fujinawa | H04N 5/23219 348/222.1 |
| 2014/0132412 | A1* | 5/2014 | Deco | G08B 21/0277 340/539.13 |
| 2014/0135042 | A1* | 5/2014 | Buchheim | H04W 4/023 455/456.6 |
| 2014/0145881 | A1* | 5/2014 | Bassan-Eskenazi | G01S 13/767 342/386 |
| 2014/0148195 | A1* | 5/2014 | Bassan-Eskenazi | G06K 7/10297 455/456.1 |
| 2014/0173439 | A1* | 6/2014 | Gutierrez | G08B 21/0236 715/727 |
| 2014/0232859 | A1* | 8/2014 | Kotzur | G01C 1/04 348/135 |
| 2014/0247366 | A1* | 9/2014 | Solhusvik | H04N 5/37452 348/187 |
| 2014/0266756 | A1* | 9/2014 | Young | G08B 21/24 340/686.6 |
| 2015/0120498 | A1* | 4/2015 | Carney | G06Q 30/02 705/26.9 |
| 2015/0204677 | A1* | 7/2015 | Yamaguchi | G06Q 30/06 701/400 |
| 2015/0242665 | A1* | 8/2015 | Antonescu | G06K 19/0724 340/8.1 |
| 2015/0243158 | A1* | 8/2015 | Bassan-Eskenazi | G01S 5/0215 340/539.32 |
| 2015/0279081 | A1 | 10/2015 | Monk et al. | |
| 2016/0091594 | A1* | 3/2016 | Li | G01S 5/12 340/539.32 |
| 2016/0345137 | A1* | 11/2016 | Ruiz | H04W 4/027 |
| 2017/0005826 | A1* | 1/2017 | Youn | H04L 12/2825 |
| 2017/0006425 | A1* | 1/2017 | Tang | G08B 13/14 |
| 2017/0180934 | A1* | 6/2017 | Brice | H04W 4/023 |
| 2017/0265038 | A1* | 9/2017 | Lin | H04B 17/318 |
| 2017/0303089 | A1* | 10/2017 | Wang | G01S 13/84 340/539.1 |
| 2017/0363706 | A1* | 12/2017 | Ikonen | G01S 3/28 |
| 2018/0204350 | A1* | 7/2018 | Cho | H04L 43/065 340/539.32 |
| 2018/0275749 | A1* | 9/2018 | Yoon | G02B 27/01 |

OTHER PUBLICATIONS

The Verge, "Amazon Echo Dot Review: Here comes the Alexa Army", by Dan Seifert, Apr. 5, 2016, 9 pages, downloaded from: https://www.theverge.com/2016/4/5/11364786/amazon-echo-dot-review-alexa (Year: 2016).*

Koontz, Floyd, "Is this EWE for you?", QST (magazine), Feb. 1995, pp. 31-33 (Year: 1995).*

Fuentes-Pacheco, Jorge, et al., "Visual simultaneous localization and mapping: a survey", Spring Science + Business B.V., Dec. 2012, [Retrieved on Sep. 9, 2016], Retrieved from the Internet: <URL: https://www.researchgate.net/publication/234081012>.

"Introduction to Real Time Location Systems", DecaWave, Application Note: APS003, 2014. p. 1-14, Dublin, Ireland.

"Sevenhugs Smart Remote: The Remote for Everything", Indiegogo, 25 pages, [Retrieved on Sep. 5, 2017], Retrieved from the Internet: <URL:https://www.indiegogo.com/projects/sevenhugs-smart-remote-the-remote>.

"Ultra-Wideband Location", NIST, Dec. 15, 2009, 3 pages, [Retrieved on Sep. 5, 2017], Retrieved from the Internet: <URL: https://www.nist.gov/programs-projects/ultra-wideband-location>.

* cited by examiner

TRACKING SYSTEMS FOR ELECTRONIC DEVICES

This application claims the benefit of provisional patent application No. 62/395,925, filed Sep. 16, 2016, which is hereby incorporated by reference herein in its entirety.

BACKGROUND

This relates generally to electronic devices and, more particularly, to wireless electronic devices that use tracking systems to track items.

Electronic devices often include wireless communications circuitry. For example, cellular telephones, computers, and other devices often contain antennas and wireless transceivers for supporting wireless communications.

Wireless electronic devices are sometimes used to locate tagged objects. For example, electronic devices sometimes include software and that allows users to track tagged objects such as a key fob using Bluetooth® signals.

It can be challenging for a user to find lost objects using an electronic device. The lost item may be out of range and undetectable by the electronic device, or the electronic device may not provide sufficiently clear instructions on how to reach the lost object.

SUMMARY

An electronic device may be provided with wireless circuitry. The wireless circuitry may include one or more antennas. The antennas may include millimeter wave antenna arrays formed from arrays of millimeter wave antennas on millimeter wave antenna array substrates. The antennas may also include wireless local area network antennas, satellite navigation system antennas, cellular telephone antennas, and other antennas. The antennas may include antennas that support ultra-wideband communications.

An electronic device may include control circuitry that may be used to locate tagged items. The control circuitry may use the wireless transceiver circuitry to determine where an item is located. The control circuitry may use the display or other output device to guide a user to the item. The display may display a visual guide such as an arrow, a sphere, a circle, a compass, a map, or other visual aid that points the user in the direction of the item. The control circuitry may change the size or other characteristic of the visual aid as the distance between the electronic device and the object changes. The control circuitry may change the location of the visual aid on the display as the orientation of the electronic device relative to the object changes. The display may overlay the visual aid onto live images of the user's surroundings as they are captured by a camera. If desired, the control circuitry may wait until the electronic device is within a predetermined range of the object before turning on the camera.

DETAILED DESCRIPTION

In some wireless systems, the services that are provided may depend on the position of one node relative to another node in the network. For example, consider a scenario in which a user of a wireless device wishes to locate a lost item. If the item has been tagged, the electronic device may determine the location of the item and may provide output to the user that lets the user know where the item is located. In this type of scenario, it may be helpful for the user to not only know the location of the lost item, but also to be guided to the item with helpful visual aids that take into account the orientation and proximity of the electronic device relative to the lost item.

Figure 1:
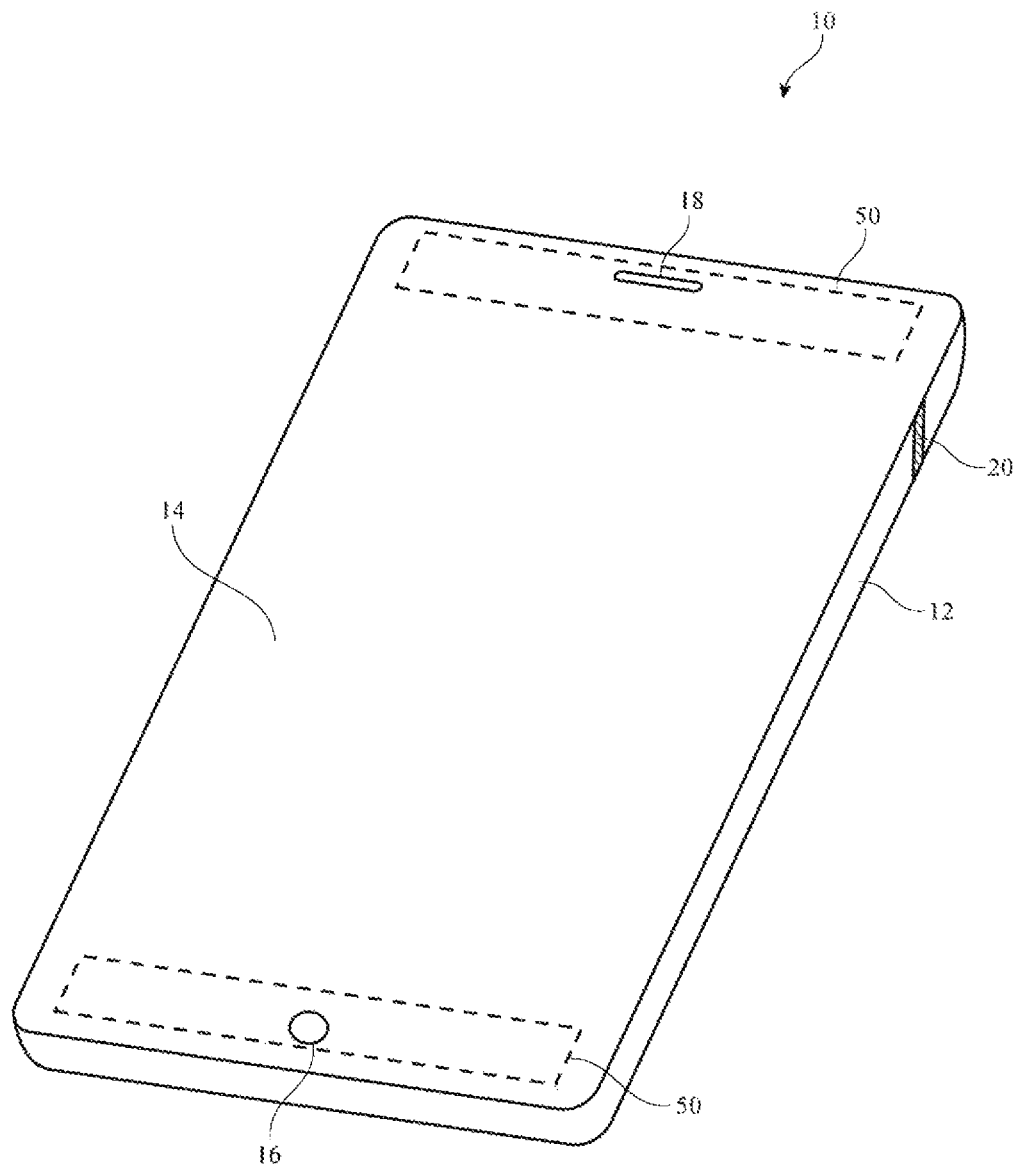
FIG. 1 is a perspective view of an illustrative electronic device with wireless communications circuitry and sensors in accordance with an embodiment.

An electronic device such as electronic device 10 of FIG. 1 may have control circuitry that determines where other objects or devices (sometimes referred to as nodes) are located relative to electronic device 10. The control circuitry in device 10 may synthesize information from cameras, motion sensors, wireless circuitry such as antennas, and other input-output circuitry to determine how far a node is relative to device 10 and to determine the orientation of device 10 relative to that node. The control circuitry may use output components in device 10 to provide output (e.g., display output, audio output, haptic output, or other suitable output) to a user of device 10 based on the position of the node.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas for handling millimeter wave communications. For example, the antennas may include millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 12 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Figure 2:
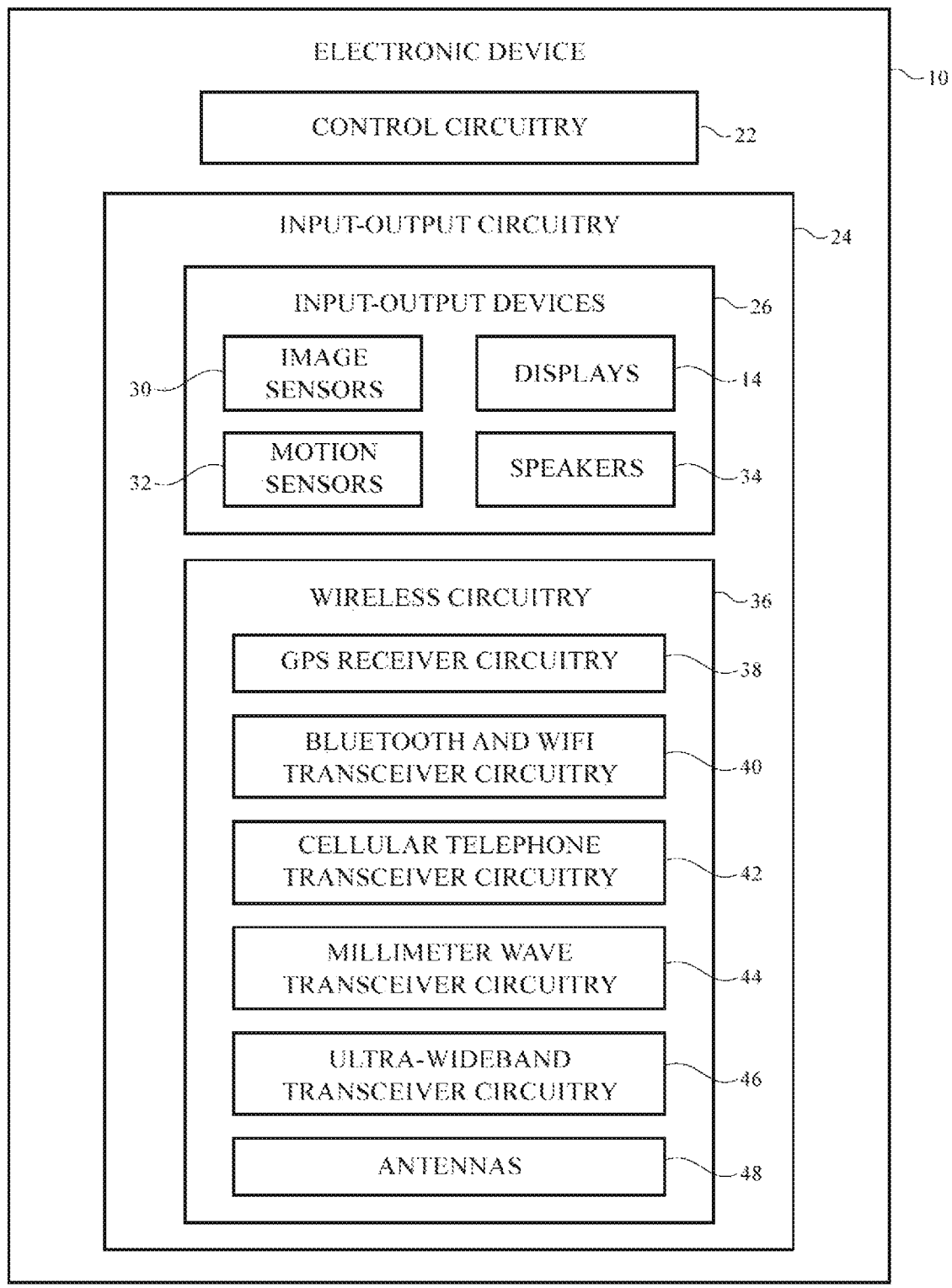
FIG. 2 is a schematic diagram of an illustrative electronic device with wireless communications circuitry and sensors in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Motion sensors 32 may include accelerometers, gyroscopes, magnetic sensors (e.g., compasses), and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 32 may include circuitry for detecting movement and orientation of device 10. Motion sensors that may be used in sensors 32 include accelerometers (e.g., accelerometers that measure acceleration along one, two, or three axes), gyroscopes, compasses, pressure sensors, other suitable types of motion sensors, etc. Storage and processing circuitry 22 may be used to store and process motion sensor data. If desired, motion sensors, processing circuitry, and storage that form motion sensor circuitry may form part of a system-on-chip integrated circuit (as an example).

Other sensors that may be included in input-output devices 26 include ambient light sensors for gathering information on ambient light levels, proximity sensor components (e.g., light-based proximity sensors, capacitive proximity sensors, and/or proximity sensors based on other structures).

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.11ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of the sidewalls of housing 12.

Figure 3:
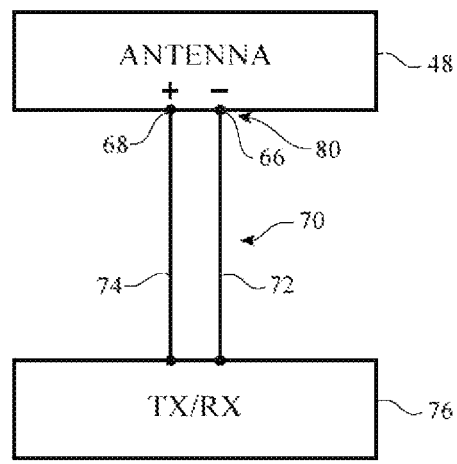
FIG. 3 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 3. As shown in FIG. 3, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 4:
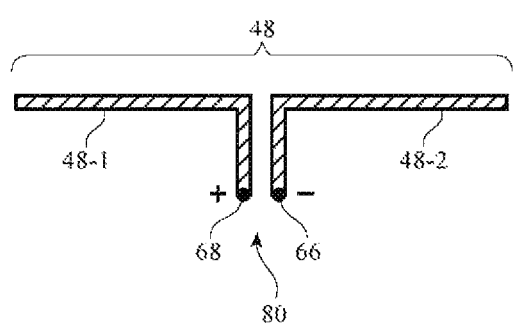
FIG. 4 is a diagram of an illustrative dipole antenna in accordance with an embodiment.

An illustrative dipole antenna is shown in FIG. 4. As shown in FIG. 4, dipole antenna 48 may have first and second arms such as arms 48-1 and 48-2 and may be fed at antenna feed 80. If desired, a dipole antenna such as dipole antenna 48 of FIG. 4 may be incorporated into a Yagi antenna (e.g., by incorporating a reflector and directors into dipole antenna 48 of FIG. 4).

Figure 5:
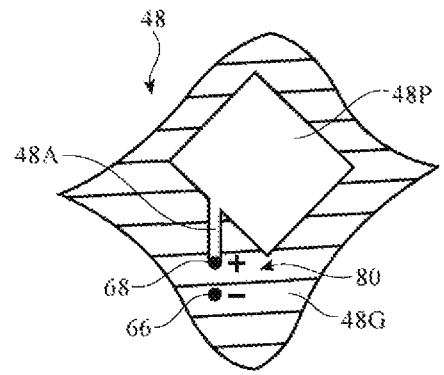
FIG. 5 is a perspective view of an illustrative patch antenna that may be used in an electronic device in accordance with an embodiment.

An illustrative patch antenna is shown in FIG. 5. As shown in FIG. 5, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 4 and 5 and/or other antennas 48 may be used in forming millimeter wave antennas. The examples of FIGS. 4 and 5 are merely illustrative.

Figure 6:
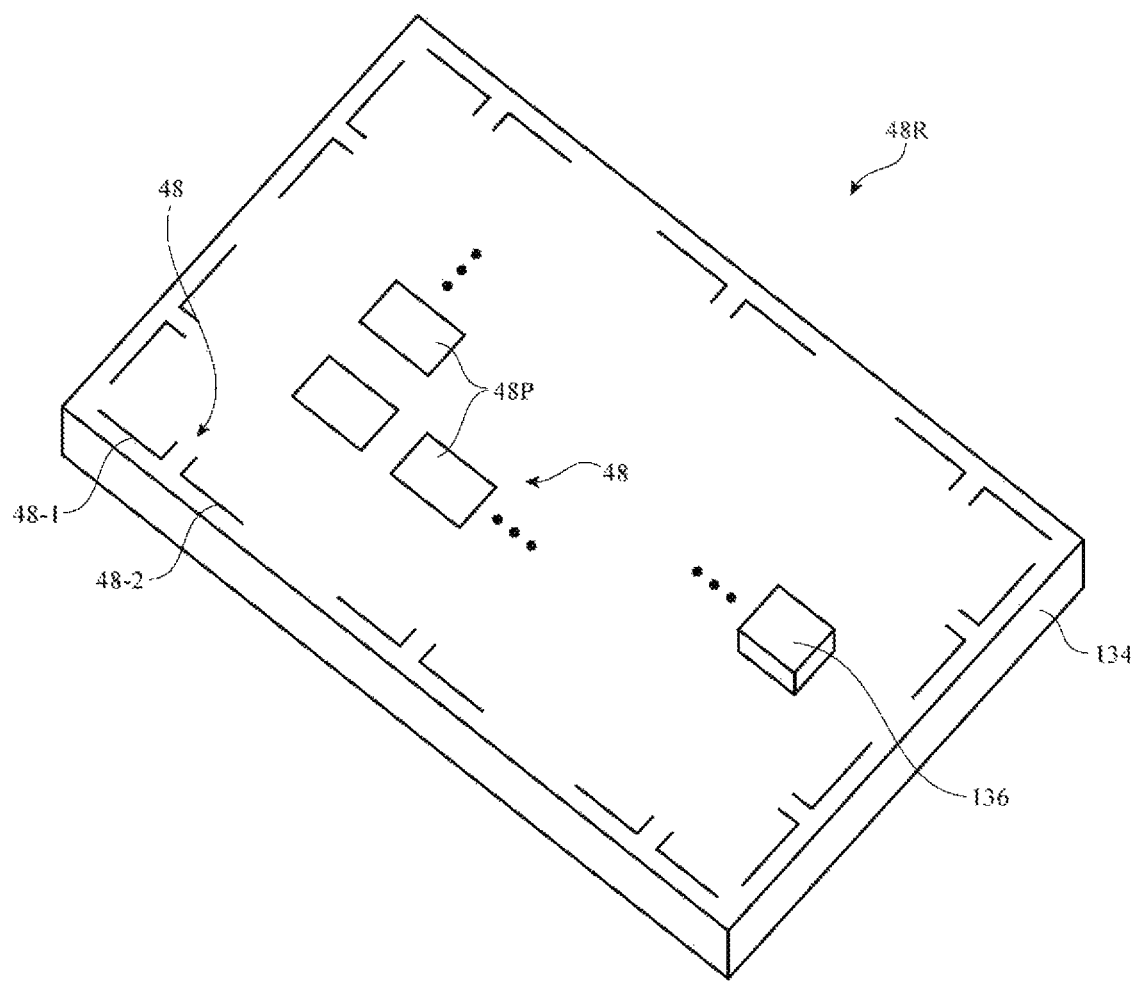
FIG. 6 is a perspective view of an illustrative array of millimeter wave antennas on a millimeter wave antenna array substrate in accordance with an embodiment.

FIG. 6 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 136 mounted on substrate 134. Device(s) 136 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 7:
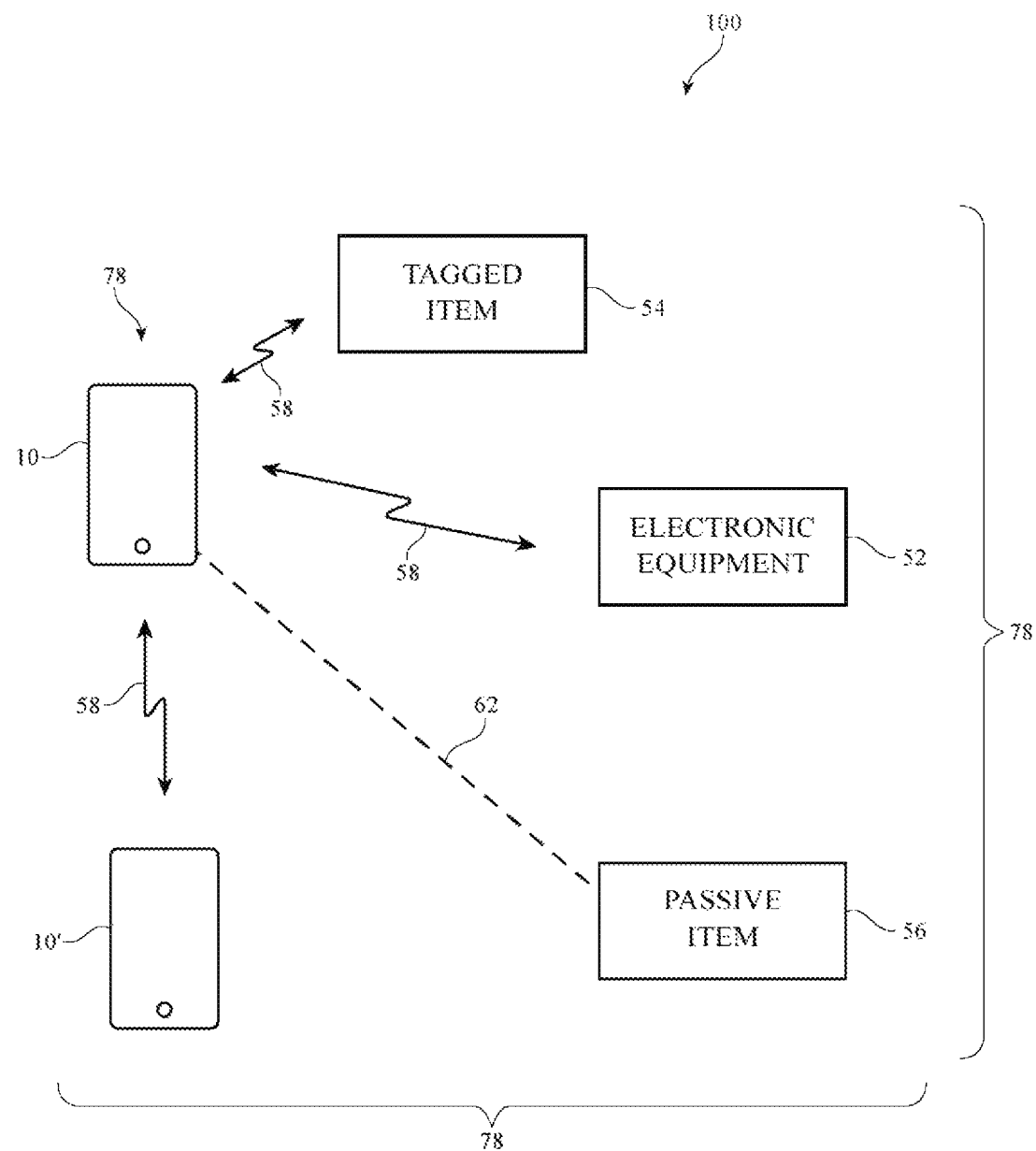
FIG. 7 is a diagram of an illustrative network having nodes in accordance with an embodiment.

FIG. 7 is a diagram of an illustrative network of objects that electronic device 10 may recognize and/or communicate wirelessly with. Network 100 may include nodes 78. Nodes 78 may be passive or active. Active nodes in network 100 may include devices that are capable of receiving and/or transmitting wireless signals such as signals 58. Active nodes in network 100 may include tagged devices such as tagged item 54, electronic equipment such as electronic equipment 52, and other electronic devices such as electronic devices 10' (e.g., devices having some or all of the same wireless communications capabilities as device 10). Tagged item 54 may be any suitable object that has been provided with a wireless receiver and/or a wireless transmitter. For example, tagged device 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from device 54 and determines the location of device 54 based on the received signals. Tagged device 54 may be passive (e.g., may not include an internal power source and may instead be powered by electromagnetic energy from device 10 or other device) or may be active (e.g., may include an internal power source).

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in network 100 such as passive object 56 may include objects that do not emit or receive radio-frequency signals such as furniture, buildings, doors, windows, walls, people, pets, and other items. Item 56 may be a tagged item that device 10 recognizes through feature tracking (e.g., using image sensor 30) or item 56 may be a virtually marked space that device 10 has assigned a set of coordinates to. For example, control circuitry 22 may construct a virtual three-dimensional space and may assign objects in the vicinity of device 10 coordinates in the virtual three-dimensional space based on their locations relative to device 10. In some arrangements, the virtual three-dimensional space may be anchored by one or more items with a known location (e.g., may be anchored by one or more tagged items 54 having a known location, electronic equipment 52 having a known location, or other items with a known location). Device 10 may then "tag" passive items such as item 56 by recording where passive item 56 is located relative to the anchored items in network 100. Device 10 may remember the virtual coordinates of passive item 56 and may take certain actions when device 10 is in a certain location or orientation relative to item 56. For example, if a user points device 10 in direction 62, control circuitry 10 may recognize that device 10 is being pointed at item 56 and may take certain actions (e.g., may display information associated with item 56 on display 14, may provide audio output via speakers 34, may provide haptic output via a vibrator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 8:
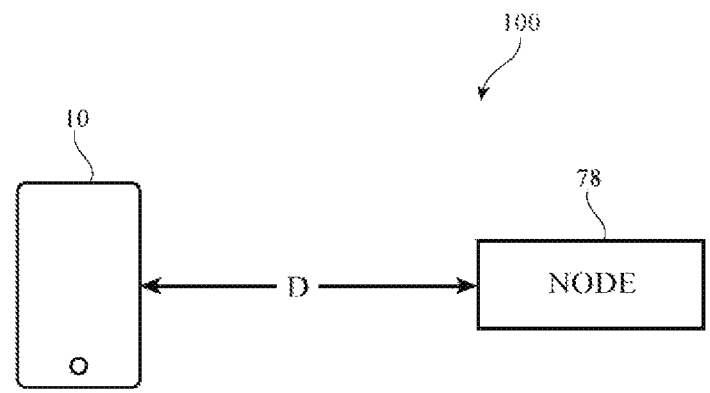
FIG. 8 is a diagram illustrating how a distance between an illustrative electronic device and a node in a network may be determined in accordance with an embodiment.

FIG. 8 shows how device 10 may determine a distance D between device 10 and node 78. In arrangements where node 78 is capable of sending or receiving communications signals (e.g., tagged item 54, electronic equipment 52, or other electronic devices 10' of FIG. 7), control circuitry 22 may determine distance D using communication signals (e.g., signals 58 of FIG. 7). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

In arrangements where node 78 is a passive object that does not send or receive wireless communications signals, control circuitry 22 may determine distance D using proximity sensors (e.g., infrared proximity sensors or other proximity sensors), using image data from camera 30, and/or using other circuitry in device 10. In some arrangements, device 10 may "tag" passive items by recording where passive item 56 is located relative to other items in network 100. By knowing the location of item 56 relative to anchored nodes in network 100 and knowing the location of the anchored nodes relative to device 10, device 10 can determine the distance D between device 10 and node 78.

Figure 9:
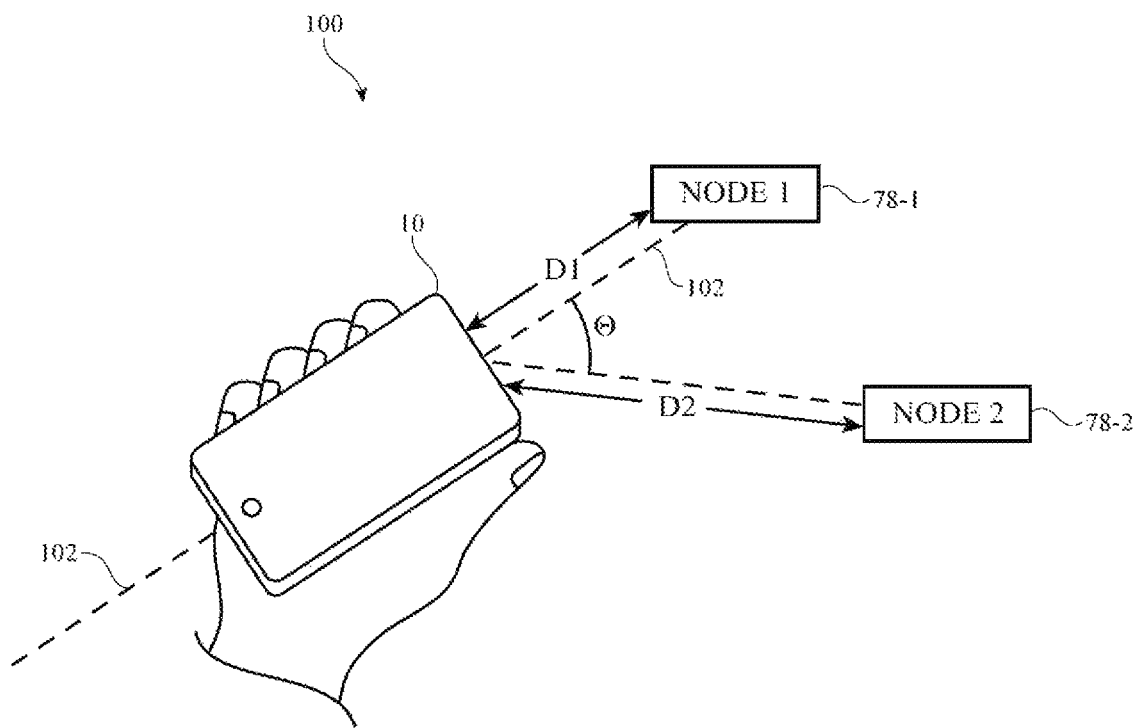
FIG. 9 is a diagram showing how a location and orientation of an illustrative electronic device relative to nodes in a network may be determined in accordance with an embodiment.

In addition to determining the distance between device 10 and nodes 78 in network 100, control circuitry 22 may be configured to determine the orientation of device 10 relative to nodes 78. As shown in FIG. 9, for example, device 10 may have a longitudinal axis such as longitudinal axis 102 that runs lengthwise down the center of device 10. Control circuitry 22 may be configured to determine where nodes 78 are located relative to longitudinal axis 102. For example, control circuitry 22 may determine that a first node such as node 78-1 at distance D1 from device 10 is located within the line of sight of longitudinal axis 102, while a second node such as node 78-2 at distance D2 is located at non-zero angle Θ relative to longitudinal axis 102. Control circuitry 22 may determine this type of orientation information using wireless communications signals (e.g., signals 58 of FIG. 7), using proximity sensors (e.g., infrared proximity sensors or other proximity sensors), motion sensor data from motion sensors 32 (e.g., data from an accelerometer, a gyroscope, a compass, or other suitable motion sensor), using image data from camera 30, and/or using other circuitry in device 10.

If desired, other axes may be used to determine the orientation of device 10 relative to other nodes 78. For example, control circuitry 22 may determine where nodes 78 are located relative to a horizontal axis that is perpendicular to longitudinal axis 102. This may be useful in determining when nodes 78 are next to a side portion of device 10 (e.g., for determining when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of axis 102 (or within a given range of axis 102), control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator or other mechanical element to generate haptic output indicating wireless pairing with node 78-1, and/or may take other suitable action.

In response to determining that node 78-2 is located at angle Θ relative to axis 102, control circuitry 22 may use display 14 to display a visual indication of the location of node 78-2 relative to device 10, may use speakers 34 to generate an audio indication of the location of node 78-2, may use a vibrator or other mechanical element to generate haptic output indicating the location of node 78-2, and/or may take other suitable action.

Figure 10:
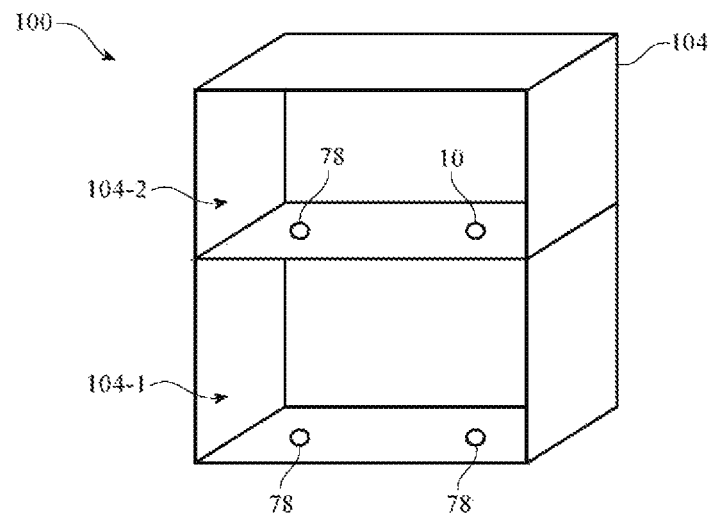
FIG. 10 is a perspective view of an illustrative scene in which the location and orientation of a node relative to other nodes in a network may be determined in accordance with an embodiment.

FIG. 10 illustrates a scenario in which the locations of nodes 78 are determined relative to other nodes 78 in network 100. In this type of scenario, device 10 does not know the absolute location of nodes 78 in network 100. However, control circuitry 22 may determine the relative location of nodes 78 using signal strength measurement schemes (e.g., measuring the signal strength of radio signals from nodes 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. For example, device 10 on second floor 104-2 of building 104 may determine that one node 78 is directly below it on first floor 104-1 of building 104 and that another node 78 is located on the same floor as device 10 at a certain distance away.

Figure 11:
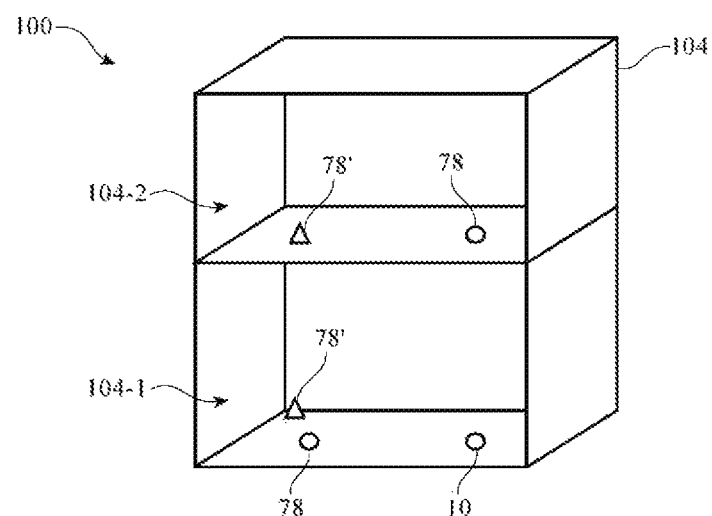
FIG. 11 is a perspective view of an illustrative scene in which the absolute location and orientation of a node may be determined using anchored nodes in a network in accordance with an embodiment.

FIG. 11 illustrates a scenario in which the absolute locations of nodes 78 are determined using anchored nodes 78' in network 100. In this type of arrangement, device 10 knows the locations (e.g., geographic coordinates) of anchored nodes 78' (e.g., a wireless access point, a beacon, or other electronic equipment 52, a tagged item 54 with a known location, etc.) and uses this information to determine the absolute location of nodes 78 (e.g., nodes with unknown locations). Thus, in addition to determining that one of nodes 78 is directly above device 10, control circuitry 22 may determine the absolute location of nodes 78 (e.g., the geographic coordinates of nodes 78).

Control circuitry 22 may use one or more output devices in device 10 to provide information on nearby nodes 78 to a user of device 10. The information may include, for example, how many nodes 78 are nearby, how close nodes 78 are to device 10, where nodes 78 are located in relation to device 10, whether or not a wireless communications link has been or can be established, the type of information that device 10 can send to or receive from nodes 78, and/or other suitable information. Control circuitry 22 may provide this type of information to a user with images on display 14, audio from speakers 34, haptic output from a vibrator or other haptic element, light from a light source such as a status indicator, and/or other output components in device 10.

Electronic device 10 may be used to track tagged objects in network 100. For example, tagged items such as item 54 of FIG. 7 may be important items that a user may wish to easily locate when needed. Electronic device 10 may use wireless circuitry 36 to track items 54. Electronic device 10 may also use image sensor 30, motion sensors 32, and display 14 to help guide the user to the lost item. For example, a camera may be used to gather images of the user's surroundings. A live feed of the camera images may be displayed on display 14. Motion sensors 32 may be used to determine how device 10 is oriented relative to the lost item. Using location information from wireless circuitry 36, motion sensor data from sensors 32, and/or image sensor data from camera 32, control circuitry 22 may not only determine where lost items are located geographically, but also where lost items are located relative to device 10. Control circuitry 22 may guide the user to the lost items using helpful visual aids that may, if desired, be overlaid on the live camera images to indicate precisely where in the user's surroundings the lost items are located.

Figure 12:
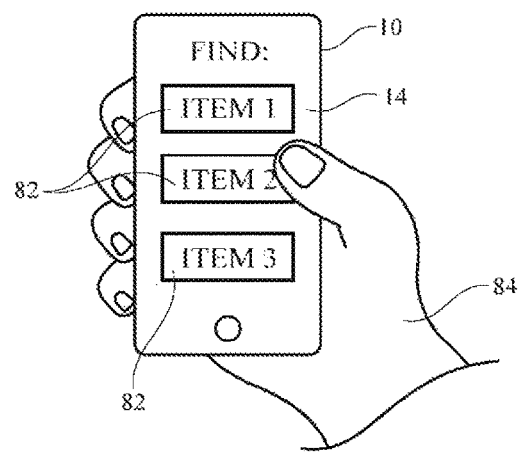
FIG. 12 is a front view of an illustrative electronic device having a display from which a user may select an item to be found in accordance with an embodiment.

FIG. 12 shows a front view of electronic device 10 in which display 14 displays a list of items 82 that may be tracked using wireless communications circuitry 36. Each item 82 may correspond to an associated one of tagged items 54. User 84 may track a tagged item 54 by selecting the appropriate item 82 on display 14.

Upon receiving input from user 84, control circuitry 22 may use wireless transceiver circuitry 36 to establish a communications link with item 54 corresponding to the selected item 82. This may include, for example, exchanging wireless signals (e.g., signals 58 of FIG. 7) with item 54 to determine the location of item 54. After determining the location of item 54, control circuitry 22 may use output components in device 10 to guide user 84 to item 54. This may include, for example, displaying information on display 14, providing audio output via speakers 34, providing haptic output via a vibrator in device 10, and/or using other output components to guide user 84 to device 10.

Figure 13:
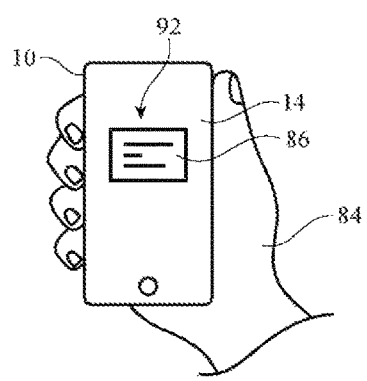
FIG. 13 is a front view of an illustrative electronic device having a display on which a list of directions are displayed to direct a user to an item in accordance with an embodiment.
Figure 14:
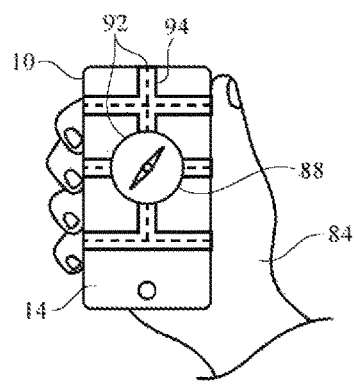
FIG. 14 is a front view of an illustrative electronic device having a display on which a compass is displayed to direct a user to an item in accordance with an embodiment.
Figure 15:
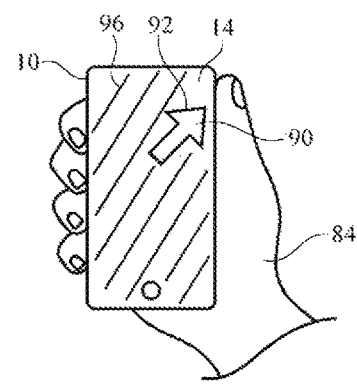
FIG. 15 is a front view of an illustrative electronic device having a display on which an arrow is displayed to direct a user to an item in accordance with an embodiment.

FIGS. 13, 14, and 15 show different examples of visual guides such as visual guide 92 that may be used to guide user 84 to item 54. In the example of FIG. 13, visual guide 92 is formed from text 86. Display 14 of device 10 displays text 86 informing user 84 of the location of item 54. For example, text 86 may indicate a distance between device 10 and item 54, may be a list of directions to reach item 54 from the current location of device 10, may be the name of a location (e.g., kitchen, office, second floor, etc.), or may be other suitable text that tells user 84 where item 54 is located. If desired, control circuitry 22 may update text 86 in real time as the location of device 10 and/or the location of item 54 changes.

In the example of FIG. 14, visual guide 92 is formed from mapping information such as map 94 and compass 88. Display 14 of device 10 displays map 94 and compass 88 to direct user 84 to item 54. Control circuitry 22 may update map 94 and compass 88 in real time as the location of device 10 and/or the location of item 54 changes.

In the example of FIG. 15, visual aid 92 is formed from an arrow such as arrow 90. Display 14 of device 10 may display arrow 90 to direct user 84 to item 54. Arrow 90 may be displayed on a background such as background 96. Background 96 may be a static background, may be a map (e.g., similar to map 94 of FIG. 14), or may be live images from a camera in device 10 (e.g., image that are displayed as the images are captured by an image sensor such as image sensor 30).

Figure 16:
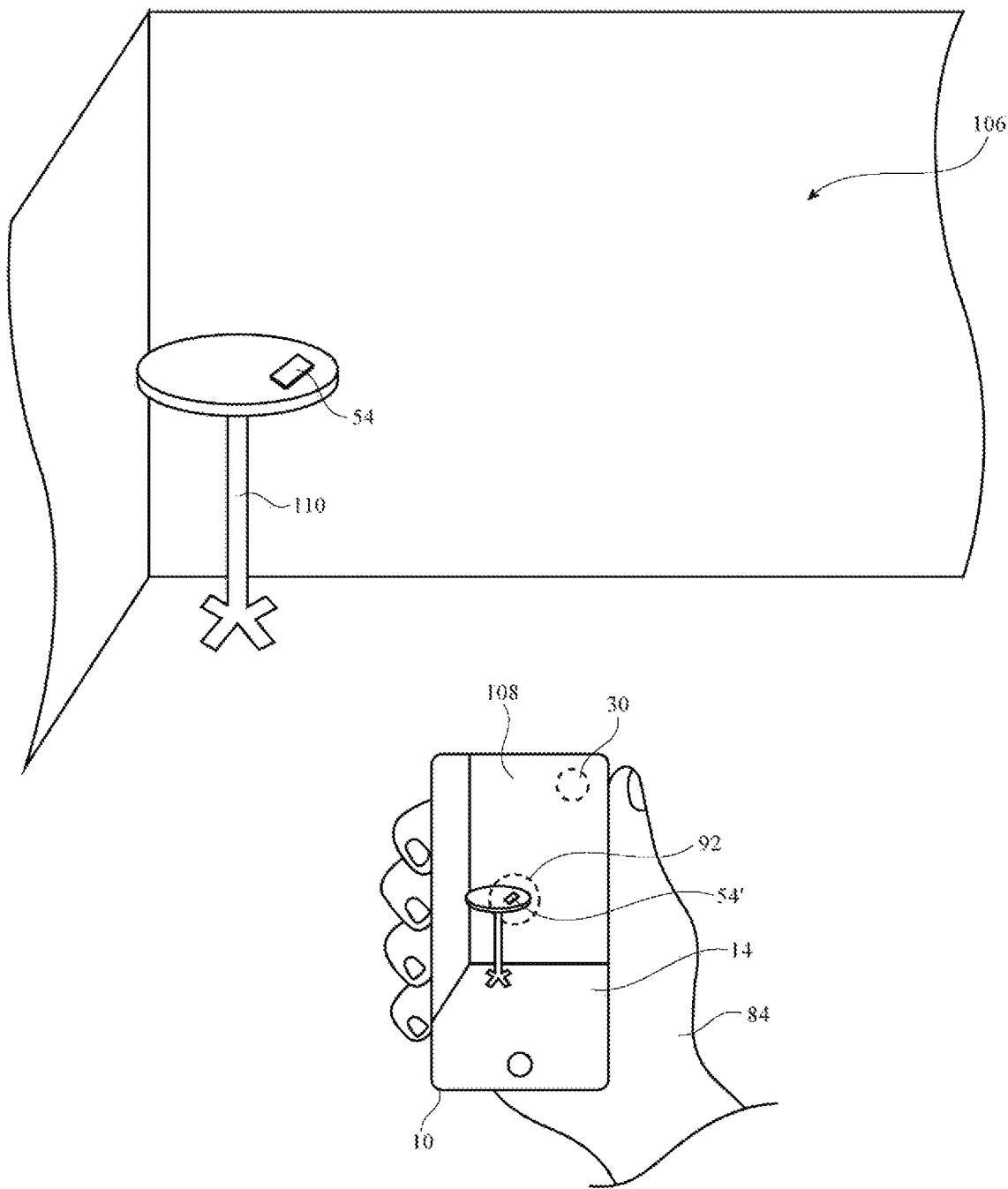
FIG. 16 is a perspective view of an illustrative scene in which an electronic device leads a user to an item using visual indicators that are overlaid on live images captured by a camera in accordance with an embodiment.

FIG. 16 shows how control circuitry 22 may use the camera function to help guide a user to a lost item. As shown in FIG. 16, device 10 may include display 14 on a front face of device 10 and a rear-facing camera such as camera 30 on a rear face of device 10. When user 84 is looking for item 54 the user may choose to use images from camera 30 as a guide. In particular, camera 30 may capture images of the surrounding area such as surrounding area 106. Display 14 may display images 108 corresponding to the live images being captured by camera 30.

To help guide user 84 to item 54, control circuitry 22 may use display 14 to display a visual aid that is overlaid onto the live camera images 108. For example, as shown in FIG. 16, display 14 may display a circle or other visual indicator 92 where item 54 appears in image 108 (see, e.g., display item 54' corresponding to the captured image of item 54 as seen by camera 30). By overlaying visual aid 92 on live camera images 108, user 84 may see precisely where item 54 is located in area 106. In the example of FIG. 16, user 84 views image 108 and is guided to display element 54' by visual aid 92, which shows user 84 that item 54 is located on table 110. In this way, control circuitry 22 may use camera 30 and display 14 to guide the eyes of user 84 to the precise location in a given area where item 54 is located.

FIGS. 17-22 illustrate various examples of visual aids that may be used to guide a user to item 54 using display 14. Various characteristics of visual aid 92 may be adjusted based on the proximity of user 84 to item 54. For example, visual aids 92 may include a "course" visual aid such as visual aid 92C and a "fine" visual aid such as visual aid 92F. Course visual aids 92C may be used when user 84 is relatively far from item 54, and fine visual aids 92F may be used when user 84 is relatively close to item 54. If desired, visual aids 92 may be adjusted between more than just one course option and one fine option. Visual aids 92 may be adjusted to any suitable level between the course and fine examples of FIGS. 17-21. These examples are merely illustrative.

Figure 17:
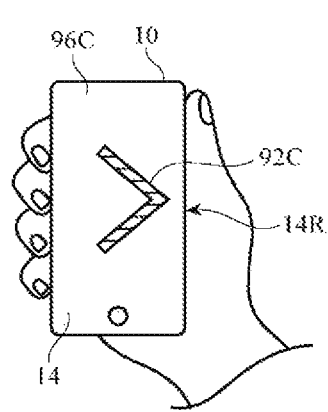
FIGS. 17 and 18 respectively show course and fine visual aids such as larger and smaller arrows that an electronic device may display to lead a user to an item in accordance with an embodiment.
Figure 18:
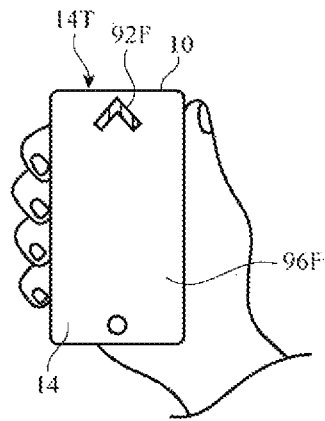

FIGS. 17 and 18 show how the size of visual aid 92 may change based on the proximity of device 10 to item 54. When device 10 is further away from item 54, a larger arrow may be used as course visual aid 92C, as shown in FIG. 17.

When device 10 is closer to item 54, a smaller arrow may be used as fine visual aid 92C, as shown in FIG. 18.

Figure 19:
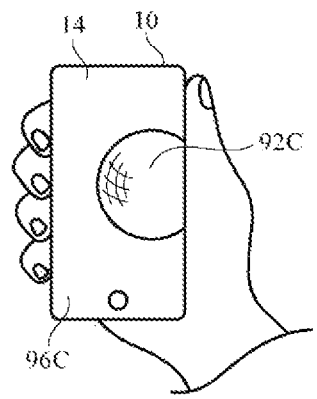
FIGS. 19 and 20 respectively show course and fine visual aids such as a sphere and a circle that an electronic device may display to lead a user to an item in accordance with an embodiment.
Figure 20:
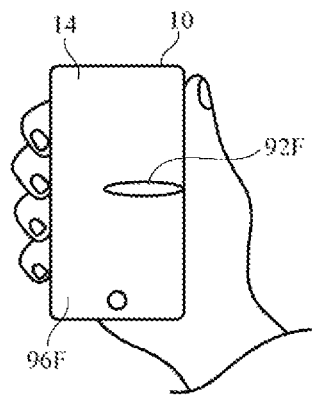

FIGS. 19 and 20 show how the shape of visual aid 92 may change based on the proximity of device 10 to item 54. When device 10 is further away from item 54, a sphere may be used as course visual aid 92C, as shown in FIG. 19. When device 10 is closer to item 54, a circle may be used as fine visual aid 92F, as shown in FIG. 20.

Figure 21:
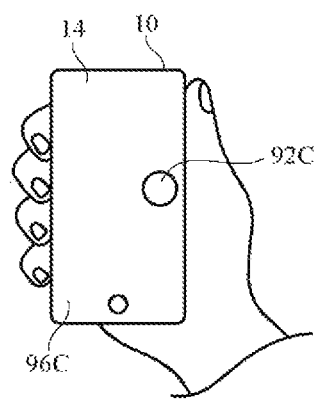
FIGS. 21 and 22 respectively show course and fine visual aids such as different color shapes that an electronic device may display to lead a user to an item in accordance with an embodiment.
Figure 22:
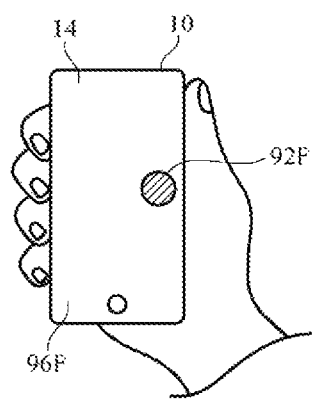

FIGS. 21 and 22 show how the color or shading of visual aid 92 may change based on the proximity of device 10 to item 54. When device 10 is further away from item 54, a first color or shade may be used for course visual aid 92C, as shown in FIG. 21. When device 10 is closer to item 54, a second color or shade may be used for fine visual aid 92F, as shown in FIG. 20.

In addition to changing characteristics of visual aid 92 based on the proximity of device 10 to item 54, control circuitry 22 may also change the location of visual aid 92 on display 14 based on where item 54 is located relative to device 10 and based on how device 10 is oriented relative to item 54. For example, as shown in FIG. 17, when item 54 is on the right hand side of device 10, visual aid 92 may appear on right hand side 14R of display 14 and may guide the user to the right. In FIG. 18, on the other hand, item 54 may be in front of the user, so visual aid 92 may appear along top edge 14T of display 14 to guide the user forward. Control circuitry 22 may, if desired, continuously update the characteristics and location of visual aid 92 on display 14 as device 10 moves and/or as item 54 moves.

Visual aids 92 of FIGS. 17-22 may be overlaid on a background such as background 96C and background 96F. If desired, backgrounds 96C and 96F may be the same background or may be different backgrounds. For example, background 96C may be used when device 10 is further away from item 54. When device 10 comes within a certain distance of item 54, background 96C may switch to background 96F. In one illustrative arrangement, the background may change to a camera view (e.g., to display live images from camera 30) in response to device 10 coming within a predetermined range of item 54. For example, background 96C may be a non-camera view (e.g., a static background or other background) and may be used at further distances, and background 96F may be a live camera view background and may be automatically turned on by control circuitry 22 when device 10 is within a predetermined distance of item 54. Waiting until device 10 is within a given range of item 54 to display a live camera view may help conserve power and may ensure that the camera function is used when it is most helpful for the user. This is, however, merely illustrative. If desired, display 14 may display a live camera view throughout the search for item 54.

The foregoing is merely illustrative and various modifications can be made to the described embodiments. The foregoing embodiments may be implemented individually or in any combination.

What is claimed is:

1. A method for operating an electronic device having control circuitry, a camera, a display, and a longitudinal axis that extends parallel to the display, the method comprising:
   with the control circuitry, determining a location of an item relative to the longitudinal axis of the electronic device, wherein determining the location of the item relative to the longitudinal axis comprises determining an angle between the item and the longitudinal axis based on radio-frequency signals;
   with the camera, capturing images of an environment around the electronic device; and
   with the display, displaying a live view of the images of the environment and overlaying a visual aid onto the live view of the images to guide a user to the location of the item, wherein the control circuitry adjusts the visual aid when the radio-frequency signals indicate a change in the angle between the item and the longitudinal axis.

2. The method defined in claim 1 wherein the visual aid comprises a visual aid selected from the group consisting of: an arrow, a circle, and a sphere.

3. The method defined in claim 1 wherein the electronic device comprises wireless communications circuitry and wherein the control circuitry determines the location of the item using the wireless communications circuitry.

4. The method defined in claim 3 wherein the wireless communications circuitry comprises circuitry selected from the group consisting of: millimeter wave communications circuitry, ultra-wideband communications circuitry, and wireless local area network communications circuitry.

5. The method defined in claim 4 further comprising:
   with the wireless communications circuitry, receiving the radio-frequency signals from the item.

6. The method defined in claim 1 further comprising:
   with the control circuitry, determining a distance between the item and the electronic device; and
   with the display, adjusting a characteristic of the visual aid in response to a change in the distance.

7. The method defined in claim 6 wherein the characteristic comprises a characteristic selected from the group consisting of: size, shape, color, and shade.

8. The method defined in claim 1 further comprising:
   with the control circuitry, determining an orientation of the electronic device relative to the item; and
   with the display, changing a location of the visual aid on the display based on a change in the orientation.

9. The method defined in claim 1 further comprising:
   with an output device, providing output to guide the user to the item, wherein the output device comprises a device selected from the group consisting of: a speaker, a vibrator, and a light source.

10. A method for operating an electronic device having wireless communications circuitry, control circuitry, a display, and a camera, comprising:
    with the wireless communications circuitry, receiving radio-frequency wireless communications signals from an object;
    with the control circuitry, determining a location of the object based on the received radio-frequency wireless communications signals; and
    with the display:
        displaying a first visual guide on a first background when the received radio-frequency wireless communications signals indicate that the electronic device is not within a predetermined range of the location; and
        displaying a second visual guide on a second background when the received radio-frequency wireless communications signals indicate that the electronic device is within a predetermined range of the location, wherein the first and second visual guides guide a user to the location of the object and wherein the first background comprises a non-camera-view background and the second background comprises images captured by the camera.

11. The method defined in claim 10 further comprising:
    with the display, displaying the images as the images are captured by the camera.

12. The method defined in claim 11 wherein displaying the second visual guide that guides the user to the location of the object comprises overlaying the second visual guide onto the images.

13. The method defined in claim 10 wherein the first and second visual guides have different shapes.

14. The method defined in claim 13 wherein the second visual guide comprises a circle that surrounds the object in the images when the object comes within view of the camera.

15. A method for operating an electronic device having ultra-wideband transceiver circuitry, motion sensor circuitry, control circuitry, a haptic output device, a display, and an axis that extends parallel to the display, the method comprising:

with the ultra-wideband transceiver circuitry, receiving a wireless signal from an object;

with motion sensor circuitry, gathering motion sensor data;

with the control circuitry:
determining an angle of arrival of the wireless signal;
determining a distance to the object at least partly based on the wireless signal; and
determining an orientation of the electronic device relative to the object based at least partly on the motion sensor data and the determined angle of arrival of the wireless signal, wherein determining the orientation of the electronic device relative to the object comprises determining a non-zero angle between the object and the axis;

with the display, displaying a visual guide on a non-camera view background that guides the user to the object based on the distance to the object and based on the orientation of the electronic device relative to the object, wherein the control circuitry adjusts a characteristic of the visual guide on the non-camera view background in response to a change in distance to the object and adjusts a location of the visual guide on the non-camera view background in response to a change in orientation of the electronic device relative to the object; and with the haptic output device, providing haptic output when the electronic device is pointed at the object.

16. The method defined in claim 15 wherein the motion sensor circuitry comprises at least one motion sensor selected from the group consisting of: an accelerometer, a gyroscope, and a compass.

17. The method defined in claim 15 wherein the control circuitry adjusts a size of the visual guide on the non-camera view background in response to the change in the distance.

18. The method defined in claim 15 wherein the control circuitry adjusts a shape of the visual guide on the non-camera view background in response to the change in the distance.

* * * * *